US008578422B2

(12) United States Patent
Renault et al.

(10) Patent No.: US 8,578,422 B2
(45) Date of Patent: Nov. 5, 2013

(54) PROCESS FOR MAKING SERVICES IN A LIST IN A TELEVISION SYSTEM AND TERMINAL ASSOCIATED WITH THE PROCESS

(75) Inventors: William Renault, Cesson Sévigné (FR); René Gauthier, Arzon (FR); Sandra Jensen, Cesson Sévigné (FR)

(73) Assignee: Thomson Licensing (FR)

( * ) Notice: Subject to any disclaimer, the term of this patent is extended or adjusted under 35 U.S.C. 154(b) by 1848 days.

(21) Appl. No.: 10/356,864

(22) Filed: Feb. 3, 2003

(65) Prior Publication Data
US 2003/0174175 A1 Sep. 18, 2003

(30) Foreign Application Priority Data

Feb. 4, 2002 (FR) ...................................... 02 01564

(51) Int. Cl.
*H04N 5/445* (2011.01)
*G06F 3/00* (2006.01)
*G06F 13/00* (2006.01)

(52) U.S. Cl.
USPC .................... 725/52; 725/44; 725/47; 725/56

(58) Field of Classification Search
USPC .......................................................... 725/56
See application file for complete search history.

(56) References Cited

U.S. PATENT DOCUMENTS

| 5,619,274 A | * | 4/1997 | Roop et al. ..................... 348/461 |
| 5,677,708 A | * | 10/1997 | Matthews et al. ....... 348/E5.104 |
| 5,822,123 A | * | 10/1998 | Davis et al. ..................... 725/43 |
| 5,850,218 A | * | 12/1998 | LaJoie et al. ..................... 725/45 |
| 5,986,650 A | * | 11/1999 | Ellis et al. ......................... 725/40 |
| 6,018,372 A | * | 1/2000 | Etheredge ......................... 725/44 |
| 6,025,869 A | * | 2/2000 | Stas et al. .......................... 725/28 |
| 6,028,599 A | | 2/2000 | Yuen et al. |
| 6,037,933 A | * | 3/2000 | Blonstein et al. ............. 715/721 |
| 6,133,909 A | * | 10/2000 | Schein et al. ................. 715/721 |
| 6,175,362 B1 | | 1/2001 | Harms et al. .................. 345/327 |

(Continued)

FOREIGN PATENT DOCUMENTS

| EP | 0822713 | 2/1998 |
| JP | 2000244835 | 9/2000 |

(Continued)

OTHER PUBLICATIONS

French Search Report dated Oct. 4, 2002.

*Primary Examiner* — Brian Pendleton
*Assistant Examiner* — Jonathan V Lewis
(74) *Attorney, Agent, or Firm* — Jack Schwartz and Associates, PLLC

(57) ABSTRACT

The invention relates to a process for selecting services in a television system using graphical indications displayed on a screen.
The invention comprises in particular the steps of:
(a) determining a first list (30) of services, the first list being a subset of a second list;
(b) displaying at least a part of the first list, ordered according to a predetermined criterion;
(c) selecting a service present in the second list, but not in the first list;
(d) displaying a visual indicator (39) marking the relative location, according to the predetermined criterion, of the selected service in the first list (30).
The invention also relates to the terminal for the implementation of the process.

15 Claims, 3 Drawing Sheets

(56) References Cited

U.S. PATENT DOCUMENTS

| | | | |
|---|---|---|---|
| 6,239,794 B1 | 5/2001 | Yuen et al. | 345/327 |
| 6,275,268 B1* | 8/2001 | Ellis et al. | 348/564 |
| 6,424,361 B1 | 7/2002 | Chapuis | |
| 6,476,825 B1* | 11/2002 | Croy et al. | 715/716 |
| 6,481,010 B2* | 11/2002 | Nishikawa et al. | 725/44 |
| 6,522,342 B1* | 2/2003 | Gagnon et al. | 715/716 |
| 6,642,939 B1* | 11/2003 | Vallone et al. | 715/721 |
| 6,690,391 B1* | 2/2004 | Proehl et al. | 715/720 |
| 6,826,351 B1* | 11/2004 | Tsujisawa et al. | 386/291 |
| 8,006,260 B2* | 8/2011 | Leung et al. | 725/30 |
| 2002/0040475 A1* | 4/2002 | Yap et al. | 725/39 |
| 2002/0049620 A1* | 4/2002 | Uchida et al. | 705/5 |
| 2002/0138827 A1* | 9/2002 | Yoshimine et al. | 725/1 |
| 2002/0147976 A1* | 10/2002 | Yuen et al. | 725/40 |
| 2002/0166123 A1* | 11/2002 | Schrader et al. | 725/58 |
| 2003/0009757 A1* | 1/2003 | Kikinis | 725/39 |
| 2004/0113929 A1* | 6/2004 | Matsuzaki | 345/700 |
| 2004/0168187 A1* | 8/2004 | Chang | 725/40 |
| 2005/0138657 A1* | 6/2005 | Leftwich | 725/45 |
| 2009/0276810 A1* | 11/2009 | Hubach et al. | 725/68 |

FOREIGN PATENT DOCUMENTS

| | | |
|---|---|---|
| WO | WO9532583 | 11/1995 |
| WO | WO0072581 | 11/2000 |
| WO | WO0135664 | 5/2001 |

* cited by examiner

PROCESS FOR MAKING SERVICES IN A LIST IN A TELEVISION SYSTEM AND TERMINAL ASSOCIATED WITH THE PROCESS

FIELD OF THE INVENTION

The invention relates to a process for selecting services in an audiovisual system, in particular a digital television system.

BACKGROUND

In a digital television system, the number of services available is becoming quite considerable. Several hundred services may be made available to the user. Navigation through the complete list of services is thus becoming tiresome, and this is why the user is afforded the possibility of creating one or more preferred lists, forming the same number of subsets of the initial list. The user can then organize these lists as he wishes and navigate around one of them to select a service to be viewed. However, during navigation around a given preferred list, access to a particular service that does not figure in the preferred list requires a certain number of manipulations for changing list and ultimately for choosing the desired service.

The THOMSON EP 822 713 Patent Application describes an EPG that screens lists of events and lists of functions. A function consists in formulating a preferred list allows a user to move from one list to another. A graphical element makes it possible to create a visual association between an element of a service list and a function list.

The HARMS U.S. Pat. No. 6,715,362 teaches a means of creating a preferred list. A screen window makes it possible to display chronologically the various events broadcast by the services of the list.

The TV GUIDE ON SCREEN—WO 95 32583 patent application describes a system for receiving audiovisual data. The list of all the services or those having a common characteristic (topic, for example) is displayed with the aid of a menu.

The YUEN—U.S. Pat. No. 6,239,794 describes a sophisticated EPG that shows windows presenting: a list of services/events that may be selected, information about the selected service/event, a video image (PIP) of the selected service/event, a function list (see FIG. 16, 17, . . . 35). The user can create a list of services/programs according to certain criteria.

Patent Application CROY—WO 01/35664 teaches an EPG that screens lists of events and lists of functions. By virtue of the direction keys, it is possible to go from one list to another. For example, the EPG displays on the left of the screen lists of elements (Topic, Time, Station, Keyword, etc.) and on the right: (Movies, Sports, Entertainment, Music, etc.), the user can select an element of the first list and then an element of the second list.

Patent application THOMSON—WO 00/72581 teaches a Program Guide receiving service information a broadcasting network and wire communication network (INTERNET type). The Guide presents a chronological schedule of the programs in the form of a list of services (vertically), each service being associated with a chronological line of events broadcast on this service.

Despite the ease of use, these documents do not teach a user how to navigate easily from a first list to a second so-called preferred list, whose elements are contained in the first, by easily exhibiting the interactions between these two lists.

SUMMARY OF THE INVENTION

A subject of the invention is a process for selecting services in a television system, wherein it comprises the steps of:
(a) determining a first list of services, the first list being a subset of a second list;
(b) displaying at least a part of the first list, ordered according to a predetermined criterion;
(c) selecting a service present in the second list, but not in the first list;
(d) displaying a visual indicator marking the relative location, according to the predetermined criterion, of the selected service in the first list.

It is thus possible easily to pre-view a service not present in the list displayed in a simple manner.

According to a particular embodiment, the process comprises a step of selecting a service in the first list, consisting in moving a cursor from a service of the first list to another service of the first list with the aid of navigation keys, the service indicated by the cursor being selected.

According to a particular embodiment, the process comprises, subsequent to steps (c) and (d), in case of activation of the navigation keys, the step of selecting a service of the first list, immediately adjacent to the visual indicator.

It is thus possible to return easily to the displayed list, even if a service not present in this list was selected previously.

According to a particular embodiment, the selecting of a service not present in the first list in step (c) is performed with the aid of one of the following steps: direct input of an identifier of the service; return to the service by an application.

According to a particular embodiment, the process furthermore comprises the step of displaying descriptive elements of a selected service, elements such as an audio and/or video stream representative of the selected service.

According to a particular embodiment, the order of the services of the first list is non-limitingly dependent on at least one of the following criteria: identification number, alphabetical order, order allocated by a user, order as a function of viewing frequency.

According to a particular embodiment, the visual indicator is one of the following elements: a bar interposed in the first list, an arrow.

A subject of the present invention is also an appliance for the reproduction of audiovisual programs comprising a means for receiving information about services associated with the programs available from the appliance, wherein it comprises the following means:
means for determining a first and a second list of services, the first list being a subset of a second list;
means for displaying at least a part of the first list, ordered according to a predetermined criterion;
means for selecting a service present in the second list, but not displayed in the first list;
means for displaying a visual indicator marking the relative location, according to the predetermined criterion, of the selected service in the first list.

BRIEF DESCRIPTION OF THE DRAWINGS

Other characteristics and advantages of the invention will become apparent through the description of an exemplary non-limiting embodiment of the invention, explained with the aid of the appended figures, among which.

DETAILED DESCRIPTION

The exemplary embodiment pertains to the realm of a digital television broadcasting system, for example of DVB type (standing for 'Digital Video Broadcast'). The invention is not limited to this realm, and may be employed in other environments where ordered lists of elements are presented to a user.

Figure 1:
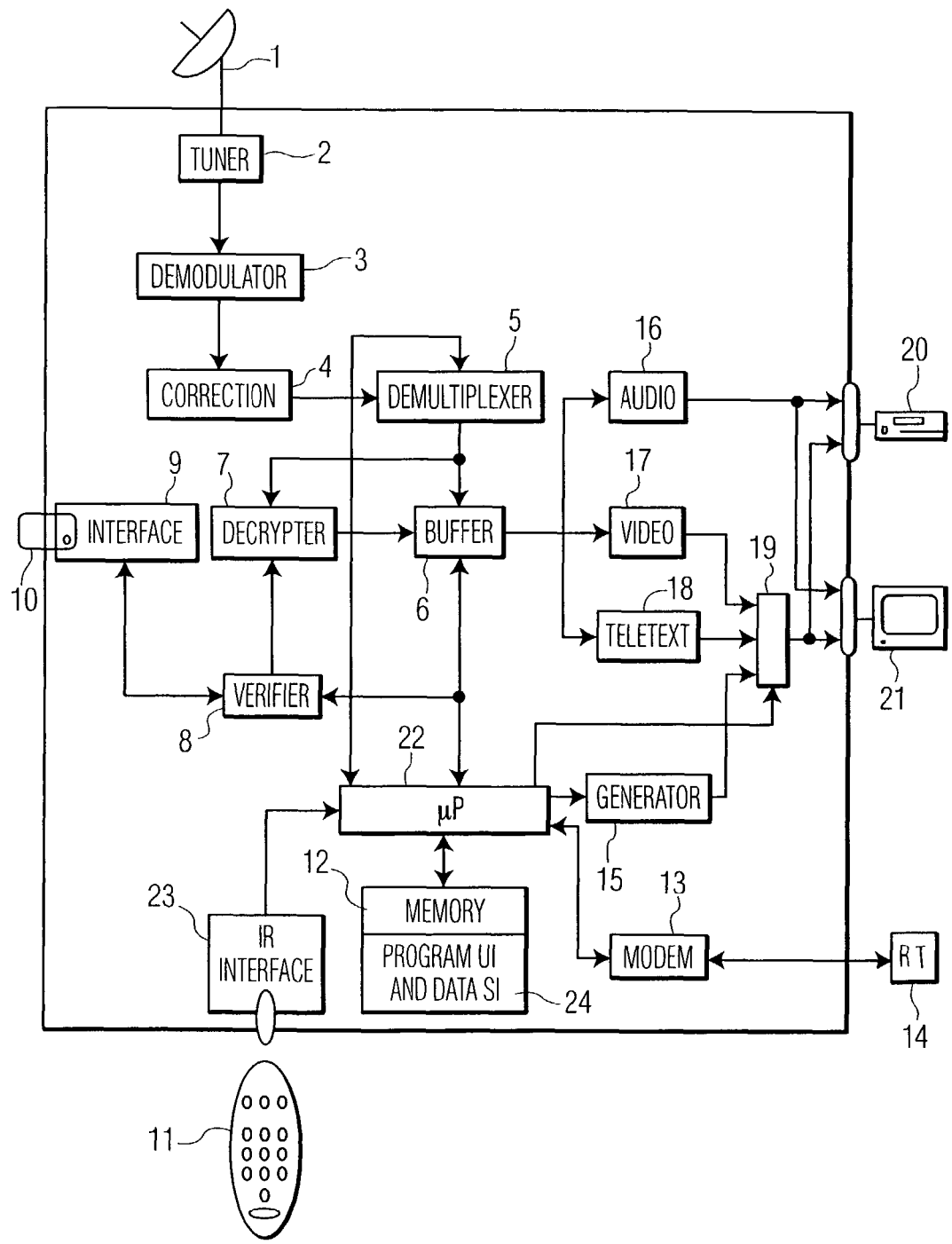
FIG. 1 is a block diagram of a digital television decoder according to the present exemplary embodiment.

FIG. 1 is a block diagram of a digital television decoder. The decoder of FIG. 1 is linked to an antenna 1, itself linked to a tuner 2 of the decoder. The signal provided by the tuner is demodulated by a demodulator 3. The demodulated data are corrected by a corrector circuit 4 and sent to a demultiplexer 5. The latter comprises a certain number of filters programmed by a microprocessor 22 as a function of the various applications supported by the decoder. The filters correspond to identification information present in the header of the packets of the demodulated signal.

The audio or video sections or packets filtered by the demultiplexer are stored in predefined areas of a buffer memory 6 for the attention of these applications. If necessary, the information is firstly deciphered by a deciphering circuit 7 as a function of the user's rights, before being stored in this buffer memory 6.

According to the present example, the applications are five in number: an audio decoder 16, a video decoder 17, a Teletext decoder 18, an access control assembly (comprising the decrypter circuit 7, a verifier micro controller 8 and an interface for microprocessor card 9 linked in normal operating mode to a microprocessor card 10), as well as a user interface module 24, in the form of an application stored in a memory 12 of the decoder. The memory 12 also comprises the decoder operating system, as well as the resident or downloaded programs for implementing the applications. For the clarity of the layout, the memory 12 is represented in the form of a single block, but simultaneously comprises random access memory, read only memory and reprogrammable nonvolatile memory (for example of the "flash" type).

The decoder also comprises an infrared interface 23 of a remote control 11, the said interface also being linked to the microprocessor 22. A modem 13 linked to the switched telephone network 14 is also controlled by the microprocessor.

A character generator 15 allows the generation of control menus or graphics relating to the parameters of the decoder or to a particular application. The video signal generated by this character generator is multiplexed with one of the video signals originating from the video decoder 17 or from the Teletext decoder 18 to a first SCART socket linked to a television set 21 or a second SCART socket linked to a video recorder 20. The multiplexing circuit 19 is managed by the microprocessor 22.

The invention relates more especially to the operation of the user interface application. This user interface comprises an electronic program guide sub-application. This guide allows the user to access information descriptive of the present and future events broadcast on the network. This information is derived from data also broadcast on the network. According to the present example, these data are DVB service data, described in greater detail in the document "EN 300 468 Digital Video Broadcasting; Specification for Service Information (SI) in DVB systems". This document is published by the ETSI ("European Telecommunications Standards Institute"). These data are transported in the multiplexed stream received by the decoder in packets possessing identifiers labeled in a manner known by the demultiplexer 5 under control of the microprocessor 22 and recovered by the latter in the buffer memory 6 for use by the user interface application. The data relating to the electronic program guide are organized in "tables" describing in a hierarchical manner the objects of the stream. A description of the available services can be obtained in a known manner in particular from a table dubbed "SDT". The hierarchy of the tables as well as the identifiers of the corresponding packets are described in the DVB document just cited. For the extraction of the packets containing the various tables, the filters of the demultiplexer 5 are programmed appropriately.

Figure 2:
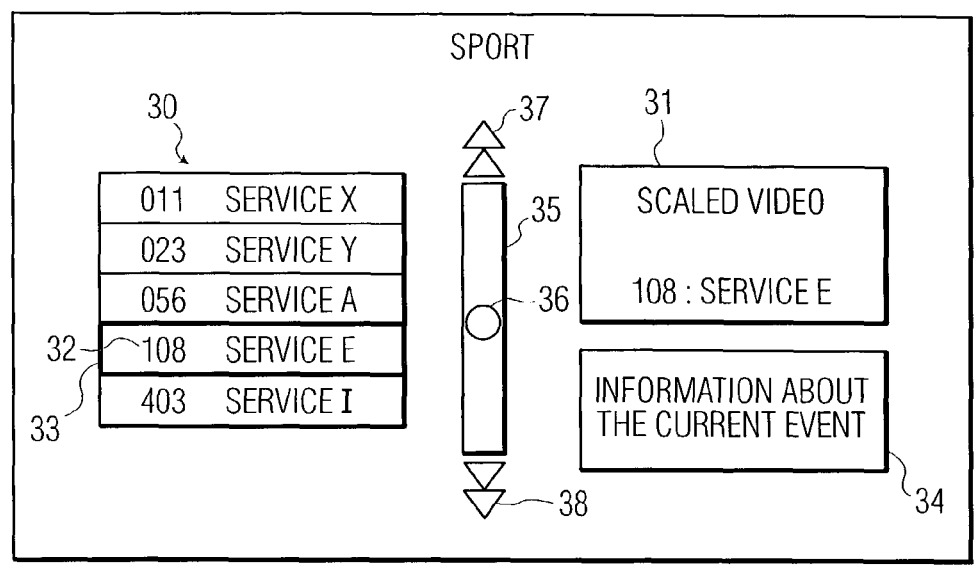
FIG. 2 is an exemplary representation on the screen of a user interface page jointly displaying a preferred list of services together with a window representative of a selected service.

FIG. 2 is a simplified layout of an exemplary screen of the user interface generated by the device of FIG. 1 and presenting a preferred list 30—the "Sports" list in the present case. Access to a particular preferred list is done by way of a hierarchy of screens of the application.

The user will have created the preferred list previously. It may also have been generated automatically and dynamically from a global list of the services available with respect to criteria descriptive of the services, such as topic. Several preferred lists may exist in parallel.

The screen also comprises a window 31 presenting in a reduced manner a selected service 32, the name of which is visually emphasized, for example by a change of color of the box 33 in which the name of this service 32 is displayed. The presentation of the selected service is as the case may be composed of the video and audio stream of the service itself, the size of the video being reduced appropriately by sub sampling. The elements of the list are ordered in increasing order of their identification numbers, these numbers being allocated in advance by the broadcaster. Moreover, a window 34 indicates additional information (for example the title and summary of the event currently being broadcast on the selected service). The order number and the name of the selected service are inlaid into the window 31 as a reminder.

The user can navigate around the preferred list with the aid of the up '↑' and down '↓' direction keys of the remote control. Only a part of the list is displayed, the list scrolling in the space allotted to it as a function of the use of the up and down keys by the user. A vertical bar 35 is disposed alongside the partial list, the bar representing the whole of the preferred list. A graphical cursor 36 indicates which part of the preferred list is currently displayed on the screen. Double arrows 37 and 38 indicate whether scrolling is possible in one direction or the other.

The user can view the selected service in full screen mode by activating the service with the aid of an "OK" key of the remote control.

It should be noted that the preferred list is ordered according to a criterion that is also available at the level of the main list, in this instance the order number of the service. Other rankings may be used: alphabetical order, order chosen by the user, order of priority according to any criterion (for example start of the next film or of a transmission of particular type), chronological order (in the case where the content of the list lends itself thereto, this being the case for example of lists of events), order according to the past duration of viewing, etc.

The user can, from the screen of FIG. 2, view in the window 31 a service that does not form part of the preferred list displayed. This is possible for example either by directly entering the number of the desired service with the aid of the digital keypad of the remote control (the user generally knowing by heart the numbers of the services that he views with a certain frequency), or because an application (such as for example the program guide of the user interface, or else another application launched by the user by selecting or activating a service of the preferred list) sends it thereto.

Figure 3:
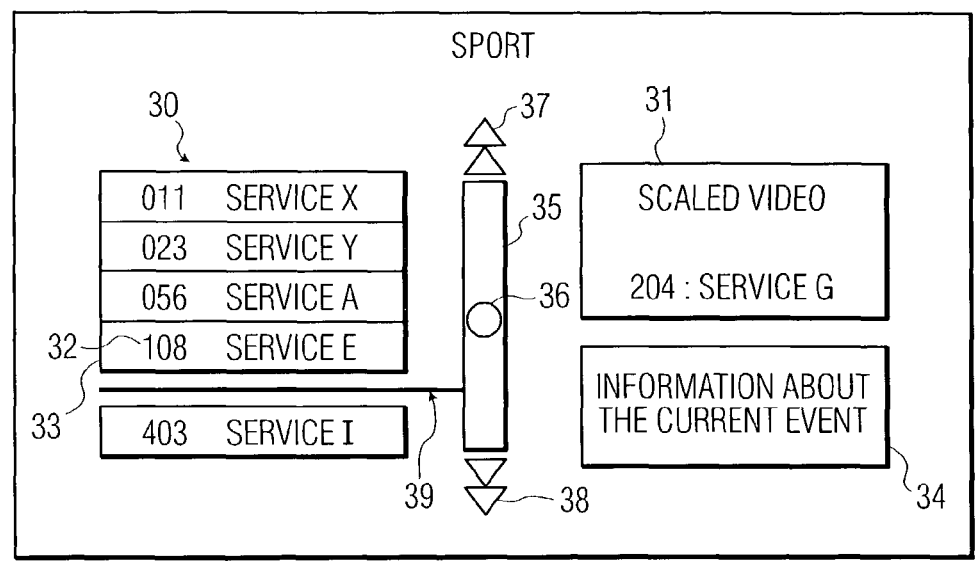
FIG. 3 is an exemplary representation on the screen of the page of FIG. 2 when the user selects a service not present in the displayed list.

The preferred list continues to be displayed on the screen. It is in fact assumed that the user does not select a service outside the list other than fleetingly, and that he subsequently wishes to resume his navigation around this list. According to the exemplary embodiment, visual feedback of this situation where the service displayed does not correspond to the preferred list is given on the screen. This visual feedback is given with the aid of a marker or indicator or else visual pointer, as illustrated by FIG. 3. Advantageously, the marker, which in the exemplary embodiment possesses the form of a horizontal bar 39 inserted into a space between two boxes of services of the preferred list, is placed in such a way as to indicate the position that the selected service would have had if it had formed part of the preferred list. Stated otherwise, the marker indicates the order of the selected service in the preferred list by using the same criterion or criteria that served to order this preferred list. In the case of FIG. 3, this is the service number.

If need be, display of the preferred list is modified so as to show the part of the list that comprises the marked place where the selected service ought to be inserted.

It is also possible to position a marker on the scroll bar 35.

If the user activates one of the up or down keys while a service external to the list is selected, a selection of the service above (service 108) respectively below (service 403) the external service is made. The user therefore returns to the preferred list. Another means of returning to this list is to directly indicate a number of a service of this list.

If the user activates the "OK" key while the external service is selected, the application displays this service in full screen mode.

Figure 4:
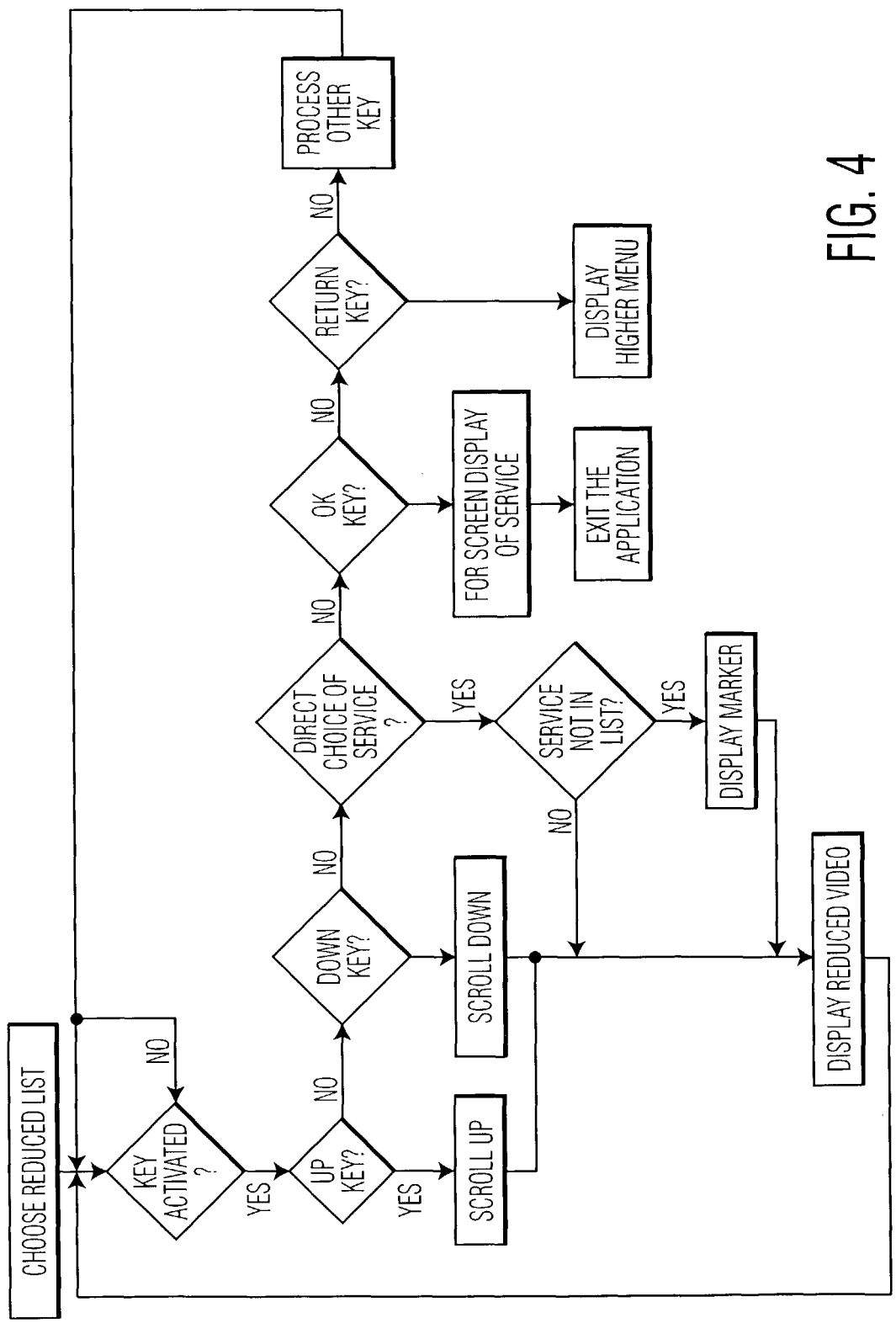
FIG. 4 is a flow chart of the process according to the present exemplary embodiment.

The general process implemented is described by the flow chart of FIG. 4.

Although the exemplary embodiment presented hereinabove relates to lists of services, the invention applies also to lists of other elements, such as events or audio, video or data files.

The invention claimed is:

1. Process for selecting services in a Digital Video Broadcast system, comprising the steps of:
   (a) receiving Digital Video Broadcast services;
   (b) determining a first list of the Digital Video Broadcast services, the first list being a subset of a second list of Digital Video Broadcast services;
   (c) displaying at least a part of the first list, ordered according to a predetermined criterion applicable also to the second list of services;
   (d) receiving a selection from a user of a service present in the second list, this service not being in the first list;
   (e) splitting the at least part of the first list, ordered according to the predetermined criterion applicable also to the second list of services, into an upper and a lower segment at a location at which the service selected by the user would appear within the first list if the service selected by the user is included in the displayed at least part of the first list; and
   (f) displaying the upper and the lower segments of the at least part of the first list and displaying a visual indicator between the upper and the lower segment of the at least part of the first list, indicating where the service selected by the user would appear within the first list if the service selected by the user is included in the first list, the visual indicator being one of a bar and an arrow and the visual indicator being distinguishable from graphical elements used for separating different services in the first list.

2. Process according to claim 1, wherein it comprises a step of selecting a service in the first list, consisting in moving a cursor from a service of the first list to another service of the first list with the aid of navigation keys, the service indicated by the cursor being selected.

3. Process according to claim 2, wherein it comprises, subsequent to steps (c) and (d), in case of activation of the navigation keys, the step of selecting a service of the first list, immediately adjacent to the visual indicator.

4. Process according to claim 1, wherein the selecting of a service not present in the first list in step (c) is performed with the aid of one of the following steps: direct input of an identifier of the service; return to the service by an application.

5. Process according to claim 2, wherein the selecting of a service not present in the first list in step (c) is performed with the aid of one of the following steps: direct input of an identifier of the service; return to the service by an application.

6. Process according to claim 3, wherein the selecting of a service not present in the first list in step (c) is performed with the aid of one of the following steps: direct input of an identifier of the service; return to the service by an application.

7. Process according to claim 1, wherein it furthermore comprises the step of displaying descriptive elements of a selected service.

8. Process according to claim 2, wherein it furthermore comprises the step of displaying descriptive elements of a selected service.

9. Process according to claims 3, wherein it furthermore comprises the step of displaying descriptive elements of a selected service.

10. Process according to claim 4, wherein it furthermore comprises the step of displaying descriptive elements of a selected service.

11. Process according to claim 1, wherein the order of the services of the first list is a function of at least one of the following criteria: identification number, alphabetical order, order allocated by a user, order as a function of viewing frequency.

12. Process according to claims 2, wherein the order of the services of the first list is a function of on at least one of the following criteria: identification number, alphabetical order, order allocated by a user, order as a function of viewing frequency.

13. Process according to claim 3, wherein the order of the services of the first list is a function of on at least one of the following criteria: identification number, alphabetical order, order allocated by a user, order as a function of viewing frequency.

14. Appliance for the reproduction of audiovisual programs comprising a processor that executes the steps of:
   receiving information about Digital Video Broadcast services associated with the programs available from the appliance;
   determining a first list of the Digital Video Broadcast services, the first list being a subset of a second list of Digital Video Broadcast services:
   displaying at least a part of the first list, ordered according to a predetermined criterion applicable also to the second list of services;

receiving a selection from a user of a service present in the second list, this service not being displayed in the first list;

splitting the at least part of the first list, ordered according to the predetermined criterion applicable also to the second list of services, into an upper and a lower segment at a location at which the service selected by the user would appear within the first list if the service selected by the user is included in the displayed at least part of the first list; and displaying the upper and the lower segments of the at least part of the first list and displaying a visual indicator between the upper and the lower segment of the at least part of the first list, indicating where the service selected by the user would appear within the first list if the service selected by the user is included in the first list, the visual indicator being one of a bar and an arrow and the visual indicator being distinguishable from graphical elements used for separating different services in the first list.

15. Process for selecting services in a television system, comprising the steps of:

(a) determining a first list of services, the first list being a subset of a second list;

(b) displaying at least a part of the first list, ordered according to a predetermined criterion applicable also to the second list of services;

(c) receiving a selection from a user of a service present in the second list, this service not being in the first list;

(d) splitting the at least part of the first list, ordered according to the predetermined criterion applicable also to the second list of services, into an upper and a lower segment at a location at which the service selected by the user from the second list would have appeared if the service selected by the user from the second list had been included in the displayed at least part of the first list, wherein the splitting between the upper and lower segments is an inserted space;

(e) displaying the upper and the lower segments of the at least part of the first list and displaying a visual indicator between the upper and the lower segment of the at least part of the first list, indicating where the service selected by the user would appear within the first list if the service selected by the user is included in the first list, wherein the visual indicator includes at least one of an arrow and a bar, and the visual indicator being distinguishable from graphical elements used for separating different services in the first list.

\* \* \* \* \*